United States Patent [19]

Foegeding et al.

[11] Patent Number: 6,139,900
[45] Date of Patent: Oct. 31, 2000

[54] METHOD OF FORMING WHEY PROTEIN PRODUCTS

[75] Inventors: E. Allen Foegeding; Stanislaw W. Mleko, both of Raleigh, N.C.

[73] Assignee: North Carolina State University, Raleigh, N.C.

[21] Appl. No.: 09/132,935

[22] Filed: Aug. 11, 1998

[51] Int. Cl.[7] ............................. A23J 1/00; A23C 17/00
[52] U.S. Cl. .......................................... 426/656; 426/583
[58] Field of Search .................................... 426/656, 583, 426/657

[56] References Cited

U.S. PATENT DOCUMENTS

| | | | |
|---|---|---|---|
| 4,675,201 | 6/1987 | Lee et al. | 426/573 |
| 4,734,287 | 3/1988 | Singer et al. | 426/41 |
| 5,217,741 | 6/1993 | Kawachi et al. | 426/573 |
| 5,350,590 | 9/1994 | McCarthy et al. | 426/549 |
| 5,416,196 | 5/1995 | Kitabatake et al. | 530/366 |
| 5,503,864 | 4/1996 | Uchida et al. | 426/583 |

OTHER PUBLICATIONS

Bagley and Christianson et al.; Swelling Capacity of Starch And Its Relationship To Suspension Viscocity–Effect Of Cooking Time, Temperature and Concentration, *Journal of Texture Studies*, 13:115–126 (1982).

Barnes; Shear–Thickening ("Dilatancy") in Suspensions of Nonaggregating Solid Particles Dispersed in Newtonian Liquids, *Journal of Rheology*, 33(2):329–366 (1989).

Boersma et al.; Computer simulations of shear thickening of concentrated dispersions, *Journal of Rheology*, 39(5):841–860 (1995).

Chow et al.; Gap size and shear history dependencies in shear thickening of a suspension ordered at rest, *Journal of Rheology*, 39(1):15–32 (1995).

Daubert and Foegeding, Rheological Principles for Food Analysis, *Introduction to Food Analysis*, Chapter 34, (Nielsen, Ed.) Chapman & Hall, N.Y. pp. 553–569 (1998).

Dintzis et al.; Shear–thickening and flow–induced structure in a system of DMSO containing waxy maize starch, *Journal of Rheology*, 39(6):1399–1408 (1995).

Goerges et al.; Etude thermodynamique de la dissociation réversible de la β–lactobuline B pour des pH supérieurs á 5,5, *Biochim Biophys. Acta.*, 59:737–739 (1962).

Hoch; Whey to Go, *Food Processing*, 3:51–52 (1997(.

Hoffmann; β–Lactoglobuline: denaturation and aggregation, PH.D Thesis, Universiteit Utrecht (1997).

Hoffmann et al.; Aggregation of β–lactoglobulin studied by in situ light scattering, *Journal of Dairy Research*, 63:423–440 (1996).

Hoffmann, et al.; Molecular Mass Distributions of Heat–Induced β–Lactoglobulin Aggregates, *J. Agric. Food Chem.*, 45:2949–2957 (1997).

Huffman, Processing Whey Protein for Use as Food Ingredient, *Food Technology*, 2:49–52 (1996).

Iametti et al.; Modifications occur at different structural levels during the heat denauration of β–lactoglobulin, *Eur. J. Biochem.*, 237:106–112 (1996).

Langton and Hermansson; Fine–stranded and particulate gels of β–lactoglobulin and whey protein at varying pH, *Food Hydrocolloids*, 5(6):523–539 (1992).

McKenzie and Sawyer; Effect of pH on β–Lactoglobulins, *Nature*, 214:110101104 (1967).

Mleko; Effect of pH on the Microstructure and Texture of Whey Protein Concentrates and Isolate Gels, *Polish Journal of Food and Nutrition Sciences*, 5/46(1):63–72 (1996).

Mleko; Rheological properties of milk and why protein desserts, *Milchwissenschaft*, 52(5):262–265 (1997).

Qi et al.; Effect of temperature on the secondary structure of β–lactoglobulin at pH6.7, as determined by CD and IR spectroscopy: a test of the motion globule hypothesis, *Biochem J.*, 324:3410346 (1997).

Shimada and Cheftel; Sulfhydryl Group/Disulfide Bond Interchange Reactions during Heat–Induced Gelation of Whey Protein Isolate, *J. Agric. Food Chem.*, 37:161–168 (1989).

Silva et al.; Granule Size Distribution and Rheological Behavior of Heated Modified Waxy and Unmodified Maize Starch Dispersions, *Journal of Texture Studies*, 28: 128–138 (1997).

Watanabe and Klostermeyer; Heat–induced changes in sulphydryl and disulphide levels of β–lactoglobulin A and the formation of polymers, *J. Dairy Research*, 43:411–418 (1976).

*Primary Examiner*—Anthony J. Weier
*Attorney, Agent, or Firm*—Myers Bigel Sibley & Sajovec, P.A.

[57] ABSTRACT

Methods for the production of whey protein dispersions using a two-step heating process are described. A whey protein solution of a predetermined concentration is heated at a first temperature and pH, allowed to cool, and heated at a second temperature and pH. The whey protein solution may be diluted between the first and second heating.

41 Claims, 8 Drawing Sheets

METHOD OF FORMING WHEY PROTEIN PRODUCTS

FIELD OF THE INVENTION

The present invention relates to methods of forming whey protein products having desirable physical properties, and the whey protein products so formed.

BACKGROUND OF THE INVENTION

Milk whey protein is prepared by removing fat and casein from milk, and comprises α-lactalbumin, β-lactoglobulin and whey albumin. The main whey protein is β-lactoglobulin (β-lg), which constitutes about 50% of the total whey proteins. Large amounts of whey proteins are produced during the manufacturing of dairy products. The nutritional value of whey proteins makes them useful as food ingredients.

Whey proteins can be used as a protein source in desserts; however, it has been difficult to produce whey protein desserts with an acceptable texture without adding carbohydrate gelling agents (Mleko, *Milchwissenshaft* 52:262–265, 1997). The viscosity of whey protein dispersions is related to the size and shape of the protein molecules. Food proteins, especially whey proteins, are small (<60 kDa) and more spherical in shape compared to carbohydrate hydrocolloids which are large (generally>200 kDa) and rod-like. For coiled molecules, the viscosity is a function of the diameter of the coil and of the extent to which solvent can drain freely through the coil without becoming entrapped by hydrodynamic forces. For a homologous series of rods of constant diameter, the viscosity increases with molecular weight, which is proportional to the length (Cantor and Schimmel 1980, *Biophysical Chemistry. Part II: Techniques for the study of biological structure and function*, W. H. Freeman and Company, San Francisco, Calif.).

The functionality of a protein or polysaccharide is associated with specific chemical and physical properties of individual macromolecules, interactions with other ingredients, and the processing operations used in producing a given food. Food proteins and carbohydrate hydrocolloids differ in functionality. For example, the viscosity of carbohydrate hydrocolloids can be several hundred times higher than food proteins at the same concentration. To be acceptable for use in food products, whey protein products must have acceptable physical properties and acceptable mouth feel.

Accordingly, it is desirable to obtain whey protein dispersions with viscosities comparable to that of carbohydrate hydrocolloids.

SUMMARY OF THE INVENTION

In view of the foregoing, a first aspect of the present invention is a method of producing a whey protein product using a solution of at least about 2% whey proteins with a pH of at least about 8.0, which is heated and then cooled. The pH of the whey protein solution is adjusted to less than about pH 8.0, and the whey protein solution is heated in a second heating step to produce a whey protein product.

A second aspect of the present invention is a method of producing a whey protein product using a first solution of whey proteins having a pH of at least about 8.0, heating and then cooling this first solution, and then diluting the solution to provide a diluted whey protein solution. The pH of the diluted whey protein solution is adjusted to less than about 8.0, and it is heated in a second heating step to produce a whey protein product.

A further aspect of the present invention is a method of producing a whey protein product by providing a first solution of whey proteins having a concentration of about 4% whey proteins and a pH of about 8.0, heating this solution in a first heating step at a temperature of at least about 75° C. and then cooling to a temperature below the gellation point of the whey proteins. The resulting whey protein solution is diluted to a concentration of from about 2.5% to about 3.5% whey proteins and the pH is adjusted to about 7.0. The diluted whey protein solution is heated in a second heating step at a temperature of at least about 75° C. to produce a whey protein product.

A further aspect of the present invention is a method of producing a whey protein product using a whey protein solution having a concentration of about 4% whey proteins and a pH of about 8.0, which is heated in a first heating step at a temperature of at least about 75° C. and then cooled to a temperature below the gellation point of the whey proteins. The pH of the solution is adjusted to about 7.0, and it is heated in a second heating step at a temperature of at least about 75° C. to produce a whey protein product.

A further aspect of the present invention is a whey protein dispersion having a viscosity of from about 200 to about 550 mPa s when measured at 50 l/s, having a concentration of whey proteins from about 2.0% to about 5.0%, and having an optical density of less than about 1.5 when measured at 630 nm.

BRIEF DESCRIPTION OF THE DRAWINGS

FIG. 1 graphs changes in apparent viscosity of 2% WPI solutions. Circles represent a 2% WPI preparation at pH 8.0 heated at 80° C. for 58 min, and then adjusted to pH 7.0 and heated at 80° C. for 1.5 hr. Triangles represent a 4% WPI solution at pH 8.0 heated in the first step to the point just before gelation (56–58 minutes) and then diluted to 2% WPI and pH adjusted to 7.0, and heated in a second step at 80° C. for 1.5 hr. The viscosity of 2% dispersions obtained from diluted 4% dispersions (triangles) was about 6 times higher than viscosity of undiluted sample (circles). Values provided are the average of three replications.

FIG. 5 graphs the apparent viscosity of WPI dispersions obtained by heating a WPI solution at pH 8.0, then diluting and heating the solution at a second concentration at pH 7.0. Squares represent a 4%-to-2.5% WPI; triangles represent a 4%-to-3% WPI; circles represent a 4%-to-3.5% WPI; and diamonds represent a 4%-to-4% (no dilution) WPI. Only those preparations at 2.5% final protein concentration showed thixotropic properties. At final protein concentrations≧3.0% the samples were rheopectic. This increase in viscosity with time at a constant shear rate was shear rate specific for each protein concentration. The shear rate showing rheopectic behavior increased as protein concentration increased. Values provided are the average of three replications.

DETAILED DESCRIPTION OF THE INVENTION

The present methods produce whey protein polymer/aggregate dispersions with desirable properties for food ingredient applications. The phrase "polymer/aggregate dispersion" as used herein describes the reactions products produced by the present methods. "Polymers" implies covalent bonding, whereas "aggregates" is a more general term covering a range of intermolecular interactions. The exact molecular structure of the present whey protein dispersions has not been ascertained; the use of the phrase polymer/aggregate dispersion is not meant to imply a particular form of bonding among the whey protein molecules.

In the present methods whey proteins are heated in a two-stage process, wherein the whey proteins are first heated at about pH≧8.0 and then heated at about pH≦8.0, to produce a whey protein dispersion having high viscosity. While not wishing to be held to a single theory of the invention, the inventors believe that the first stage of heating at pH≧8.0 allows whey protein polymers to form by intermolecular disulfide bonds. These polymers have limited viscosity. The second heating stage at pH≦8.0 causes the whey protein polymers to form into soluble aggregates (although additional polymers may also form during this second heating stage). These soluble aggregates have a high viscosity, presumably due to the large asymmetric size of the aggregates, and can form weak gels. The present methods provide whey protein dispersions containing aggregates of increased size, compared to those produced by other methods. The whey protein dispersions so produced have desirable functional propelties. The present inventors further determined that the viscosity of the final whey protein product could be increased by heating at a first concentration of whey protein, and then diluting the whey protein solution to a second concentration and heating the diluted whey protein solution.

The whey protein aggregates produced by the methods of the present invention may be used in food applications in essentially the same manner as food polysaccharide ingredients. Such uses include thickening and stabilizing food products such as infant and enteral formulas. The whey protein aggregates produced by the present methods differ from food polysaccharides in that they are surface active, and thus may be suitable for use in creating and stabilizing emulsions and foams.

One-step heating methods for the production of whey polymers are known. However, the size of the polymers that are produced are limited, which affects the functional properties of the whey polymer product. Hoffmann et al. *J. Dairy Res.* 63:423–440 (1996) observed formation of very large β-lactoglobulin aggregates at pH≦6.4.

U.S. Pat. No. 5,416,196 to Kitabatake et al. describes a method of producing a transparent, purified milk whey protein having a salt concentration of less than 50 millimoles/liter. Using this purified whey protein in solution, Kitabatake et al. produced a whey protein product by adjusting the pH of the solution to either below 4 or above 6, heating the pH adjusted solution, readjusting the pH to either below 4 or above 6, and again heating the solution. The Kitabatake patent describes the use of whey protein from which the salts and saccharides normally contained in whey are substantially removed, for example by dialysis, chromatography, or microfiltration. While salt may be re-added to the whey solution during processing for flavoring, this is done after adjusting the pH. In contrast to the methods of U.S. Pat. No. 5,416,196, the present methods do not require the use of salt-free or low-salt whey proteins as a starting material. The present methods may utilize as a first whey protein solution one that contains at least about 50 millimolar of salt, at least 50 millimolar of salt, more than 50 millimolar of salt, more than about 75 millimolar of salt, or more than about 100 millimolar of salt. (All patents cited herein are intended to be incorporated in their entirety herein.)

At room temperature and pH near neutral, β-lactoglobulin (β-lg) exists as a dimer, but dissociates into monomers ($M_r$=18,400 Da) at higher temperatures (Georges et al.

Biochim. Biophys. Acta 59:737–739, 1962). The dissociated monomers expose inner hydrophobic groups and reactive thiol groups (McKenzie and Sawyer, Nature 14:1101–1104, 1967). The thiol groups are involved in intramolecular and intermolecular interchange reactions which cause the formation of disulfide-linked polymers (Watanabe and Klostermeyer, J. Dairy Research 43:411–418, 1976; Shimada and Cheftel J. Agic. Food Chem. 37:161–168 1989). Aggregation of β-lg also involves non-covalent interactions. At pH values closer to the isoelectric point of whey proteins (about 5.2), hydrophobic interactions are involved (Hoffmann, β-Lactoglobulin: denaturation and aggregation. Ph.D. thesis, Universiteit Utrecht, 1997).

The present methods provide low-concentration whey protein dispersions with viscosities comparable to that of carbohydrate hydrocolloids and are produced using a two-step heating process to polymerize and aggregate whey proteins.

The present inventors found that the viscosity of whey protein solutions could be substantially increased by using a two-stage heating process. The first heating step is carried out at about pH 8.0 or higher, and the second heating is carried out at a pH of less than about 8.0, and preferably at a pH of from about 6.0 to about 7.5. While not wishing to be held to a single theory of the present invention, the inventors surmise that the first heating step favors polymerization of β-lactoglobulin by disulfide bonds. Once formed, disulfide-linked aggregates can participate in a second stage of aggregation, where the conditions favor non-covalent bonds. At this second heating stage, use of lower pH gives higher viscosities, possibly due to more extensive formation of non-covalent cross-linked aggregates. Formation of large aggregates is favored at protein concentrations high enough to make a gel. Dispersions of whey protein polymers produced by the present methods were generally pseudoplastic and thixotropic; however, dilatant and rheopectic behaviors were also observed.

The present inventors further determined that viscosity of whey protein solutions heated at a first protein concentration and then diluted to a final concentration and subjected to a second heating was about six times higher than the viscosity of a solution that was heated twice at a single concentration. A second heating at a lowered pH resulted in still higher viscosity. The resulting whey protein solutions were generally thixotropic and pseudoplastic, however, dilatant and rheopectic behavior was also observed. A 4% whey protein solution can be converted, using the present methods, to a polymer/aggregate solution with a viscosity comparable to the viscosity of 1% carbohydrate hydrocolloids.

The present inventors further determined that desirable whey protein products were produced using a two-stage heating process where the whey protein solution was diluted to a final concentration after the first heating step and prior to the second heating step, and where the first heating step is carried out at about pH 8.0 or higher, and the second heating step is carried out at a pH of less than about 8.0.

The whey protein polymers produced by the present methods may further be dried to form a powder. Methods of drying polysaccharide hydrocolloids known in the art may be utilized to dry the present whey protein polymer/aggregates to provide a powdered product.

The present methods utilizing a two-stage heating of whey proteins (the first at about pH 8.0 and the second heating at about pH 7.0) produce whey protein polymer/aggregates with a high viscosity. Methods utilizing a second stage heating at pH 6.0 produce more particulate polymer/aggregates, while a second stage heating at pH 8.0 produce whey polymer/aggregates with lower viscosities. Dispersions of whey protein polymer/aggregates produced by the present methods are generally pseudoplastic and thixotropic.

The present methods utilize a first whey protein solution having at least about 2% (w/v) whey proteins, from about 2% to about 8% (w/v) whey proteins; at least about 4% (w/v) whey proteins; or preferably from about 4% to about 6% (w/v) whey proteins. The whey protein solution is adjusted, if needed, to have a pH of at least about 8.0, from about 8.0 to about 10.0, from about 8.0 to about 9.0, or preferably at about 8.0.

The whey protein solution is heated in a first heating step to a predetermined temperature above the gellation point of the whey protein solution, for a predetermined time. The time of heating will vary with the particular concentration of the whey proteins; suitable heating times to provide a desirable product can be determined for various concentrations of whey proteins using routine experimentation. Preferably the temperature is at least about 75° C., from about 75° C. to about 95° C., or from about 80° C. to about 85° C. The duration of heating will generally be from about 10 minutes to about 120 minutes, from about 45 minutes to about 90 minutes, or from about 50 minutes to about 65 minutes.

The whey protein solution is then cooled to a temperature below the gellation point of the whey proteins (i.e., a temperature below the point at which protein start to nature, which generally is at or below about 60° C.), preferably to at least below 60° C., or to a point between at least about 20° C. and below about 60° C., or to room temperature.

The pH of the whey protein solution is then adjusted so that it is below about 8.0, or from about 6.0 to about 7.5, and preferably to about 7.0. The whey protein solution is then heated in a second heating step to a predetermined temperature above the gellation point of the whey protein solution, for a predetermined time. The time of heating will vary with the particular concentration of the whey proteins; suitable heating times to provide a desirable product can be determined for various concentrations of whey proteins using routine experimentation. Preferably the temperature is at least about 75° C., from about 75° C. to about 95° C., or from about 80° C. to about 85° C. The duration of the second heating will generally be from about 10 minutes to about 120 minutes, and may be from about 30 minutes to about 100 minutes, or from about 60 minutes to about 90 minutes.

Additionally, the whey protein solution may be diluted prior to the second heating step, so that the whey protein solution is less concentrated during the second heating step as compared to the first heating step. The whey protein solution is diluted to a concentration of less than about 4%, preferably from about 4% to about 2%. Suitable concentrations include 3.5%, 3.0% and 2.5% w/v whey proteins. Preferably, the whey protein solution is about 4% prior to the first heating step, and is diluted so that it is at least about 3.0% prior to the second heating.

As used herein, a "dispersion" or a "sol" is a colloidal solution consisting of a suitable dispersion medium and a colloidal substance which is distributed through the dispersion medium. The present whey protein dispersions contain whey protein polymers and aggregates of polymers.

As used herein, a "gel" refers to a two phase colloidal or polymer system consisting of a solid and a liquid. Gels are solids, whereas sols are fluids. "Gelation" refers to the process of forming a gel from a sol.

The term "whey protein solution" or "solution of whey proteins" as used herein refers to an aqueous solution.

As used herein, a "translucent" material generally refers to a material that transmits rays of light so diffused that objects cannot be seen distinctly, i.e., the material admits light but impedes vision, it is cloudy yet not opaque. Translucency, or the optical density of a material, can be measured as the percentage of light in the visible spectrum that is transmitted through the material. Enhanced translucency in whey protein products is desirable. Whey protein dispersions produced by the present methods preferably have an optical density of less than about 2.0 when measured at a wavelength of 630 nm (1 cm path length); more preferably whey protein dispersions produced by the methods of the present invention have an optical density of less than about 1.75 or less than about 1.50, less than about 1.40, or less than about 1.30 (measured at 630 nm and 1 cm path length); most preferably whey protein dispersions produced by the methods of the present invention have an optical density of less than about 1.20, less than about 1.10 or even less than about 1.00 (measured at 630 nm and 1 cm path length).

As used herein, "thixotropic" refers to a material whose viscosity decreases over time with a constant rate of stirring (time-dependent shear-thinning); "rheopectic" refers to a material whose viscosity increases over time at a constant rate of stirring (time-dependent shear-thickening); "viscosity" refers to the internal resistance to flow offered by a gas or liquid when subjected to shear stress; a "dilatant" material is one whose viscosity increases with an increased rate of stirring (shear-dependent thickening); a "pseudoplastic" fluid is one whose apparent viscosity decreases with an increased rate of stirring (shear-thinning). The "apparent viscosity" is the viscosity of a material at different shear rates (non-Newtonian fluids). These concepts and other rheological principles in food analysis are described in the literature; see, e.g., Daubert and Foegeding. *Rheological Principles for Food Analysis,* In: Introduction to Food Analysis, Ed. S. S. Nielsen, Chapman & Hall, N.Y., pp. 553–569 (1998).

The examples which follow are set forth to illustrate the present invention, and are not to be construed as limiting thereof.

EXAMPLE 1

Materials and Methods

Three different lots of whey protein isolate (WPI) were obtained from DAVISCO Food Ingredients International (Le Sueur, Minn.). The protein content was determined by analyzing for nitrogen (macro Kjeldahl, AOAC 1984 *Official Methods of Analysis,* 14th ed. Association of Official Analytical Chemists, Arlington, Va.) and calculating protein as N×6.38.

The following polysaccharides were used: xanthan gum, gellan gum (Nutra Sweet Kelco Company, San Diego, Calif.), locust bean gum and guar gum (Rhone-Poulenc, Washington, Pa.).

All WPI suspensions were made on a % weight/volume (w/v) protein basis (not powder mass/volume) by hydrating in 0.1 M NaCl with constant mixing for one hour at room temperature and adjusting the pH using 2 N NaOH or 2 N HCl. WPI suspensions were heated in glass tubes at 80° C. until they began to gel (56–59 minutes). Tubes were cooled in tap water to room temperature and the suspension was diluted with 0.1 M NaCl and adjusted to the desired pH. These were further heated in glass tubes in a water bath at 80° C. for 1½ hours. After cooling tubes in tap water, all samples were held overnight at 7±2° C.

For comparison, 1% solutions of polysaccharides in 0.1 M NaCl were prepared by mixing for 1 hour at 80° C. and cooling to room temperature.

Viscosity was measured using a Haake VT 550 rheometer (Haake, Karlsruhe, Germany) equipped with a coaxial rotational cylinder system (MV II measuring cell, gap size -2.80 mm). A temperature of 25±0.5° C. was maintained by a Haake F6 thermostat. The shear rate was changed every 3 minutes in the following sequence: 50, 100, 250, 500, 700, 500, 250, 100 and 50 (1/s) (reciprocal seconds). Rheopectic behavior was measured using a constant shear rate increase and decrease. This was done with Haake VT 550 rheometer and a Bohlin VOR rheometer (Bohlin Reologi AB, Lund, Sweden). The Bohlin rheometer had a concentric-cylinder-fixed bob and rotating-cup measuring cell (C 25, gap size -1.55 mm) attached to a 13.2 grams centimeter torsion bar.

EXAMPLE 2

Viscosity of 2% WPI Dispersions

Prepared using Varied Concentrations and pH

Preliminary research showed that heated whey protein suspensions were non-Newtonian and changed in viscosity with shear rate and time. To separate the effect of time from the effect of shear rate on viscosity, shear sweep measurements were performed which included three minute holding periods at a variety of shear rates. Values of final viscosity at 50 (1/s) after all shear rate cycles are presented in Table 1. The average coefficient of variation among the 16 different whey protein dispersions was 9.9%, slightly greater than the 6.4% average coefficient of variation for the hydrocolloid solutions tested. The greater coefficient of variation for the whey protein dispersions reflects the variance in polymer formation (three replications) and the viscosity measurement, while the hydrocolloid solutions variance is due to dispersing the same polymers and measuring the viscosity three times. The low degree of variance for the whey protein dispersions indicates that polymer formation was a repeatable process. In most cases, coefficient of variation was about 10% or lower.

Figure 1:
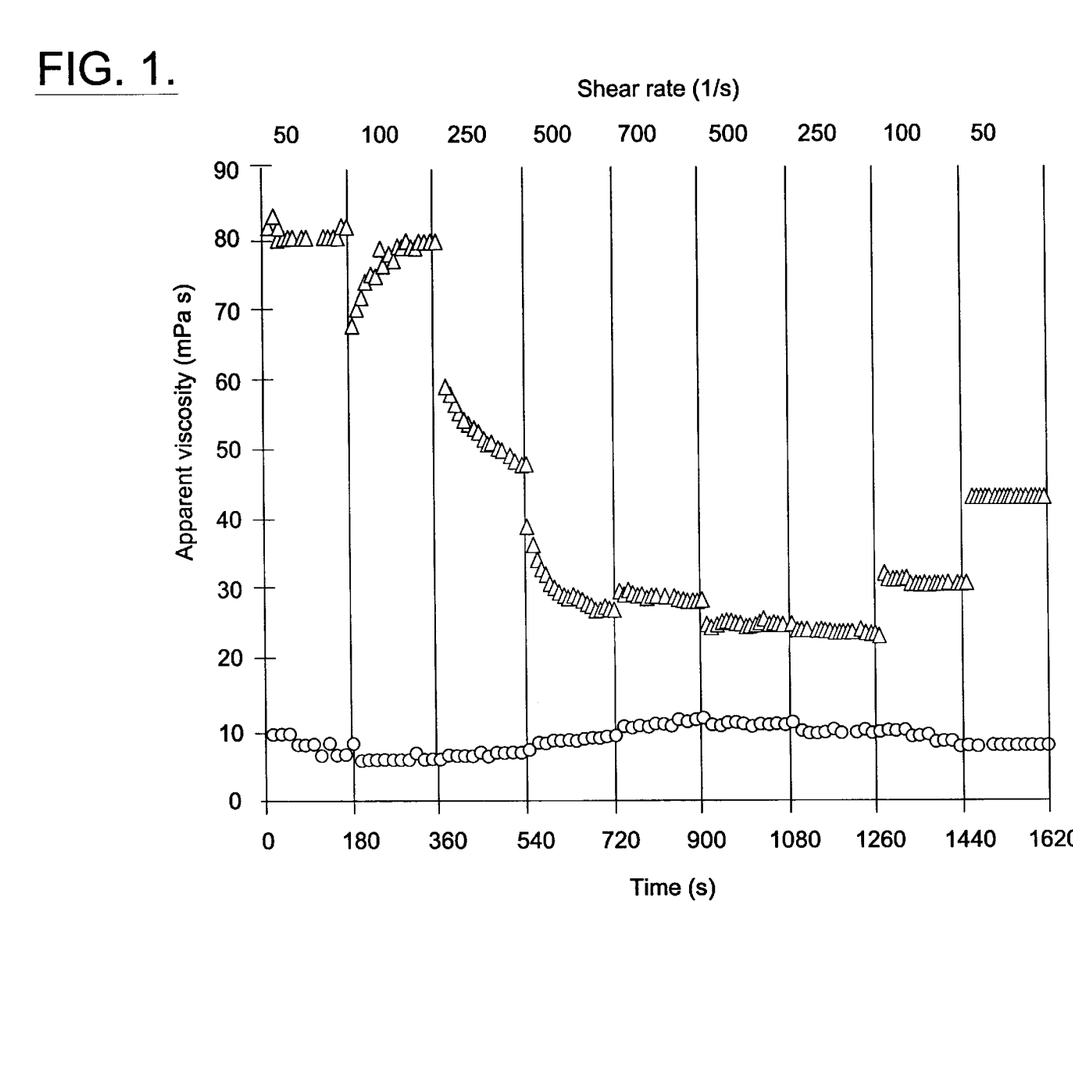

The flow properties of whey protein polymer/aggregate dispersions varied depending on the protein concentration of the heated solution. FIG. 1 represents changes in viscosity of 2% WPI solutions. One preparation (Preparation A) was obtained by heating 2% WPI (pH 8.0) at 80° C. for 58 minutes, adjusting pH to 7.0, then heating at 80° C. for 1.5 hours. A second preparation (Preparation B) was obtained by heating 4% WPI (pH 8.0) solution to the point just before gelation (56–58 minutes), when the sample was very viscous but still a fluid, and then diluting the solution to 2%, adjusting pH to 7.0, and heating at 80° C. for 1.5 hours. (WPI dispersions produced by heating a first 4% WPI solution and then diluting the solution to 2% WPI prior to a second heating are indicated herein as "4%-to-2% solutions ").

Rheological behavior of these 2% WPI preparations differed (FIG. 1). The viscosity of a 2% dispersion obtained from diluted 4% dispersions (Prep. B) was about 6 times higher than viscosity of an undiluted preparation (Prep. A). Preparation B was highly thixotropic and pseudoplastic as viscosity decreased with time and shear rate. The time dependent thixotropic or rheopectic behaviors refer to the overall changes in viscosity occurring over the up and down shear rate sweeps (shear rate range of 50–700 1/s over a total time of 27 minutes).

Figure 2:
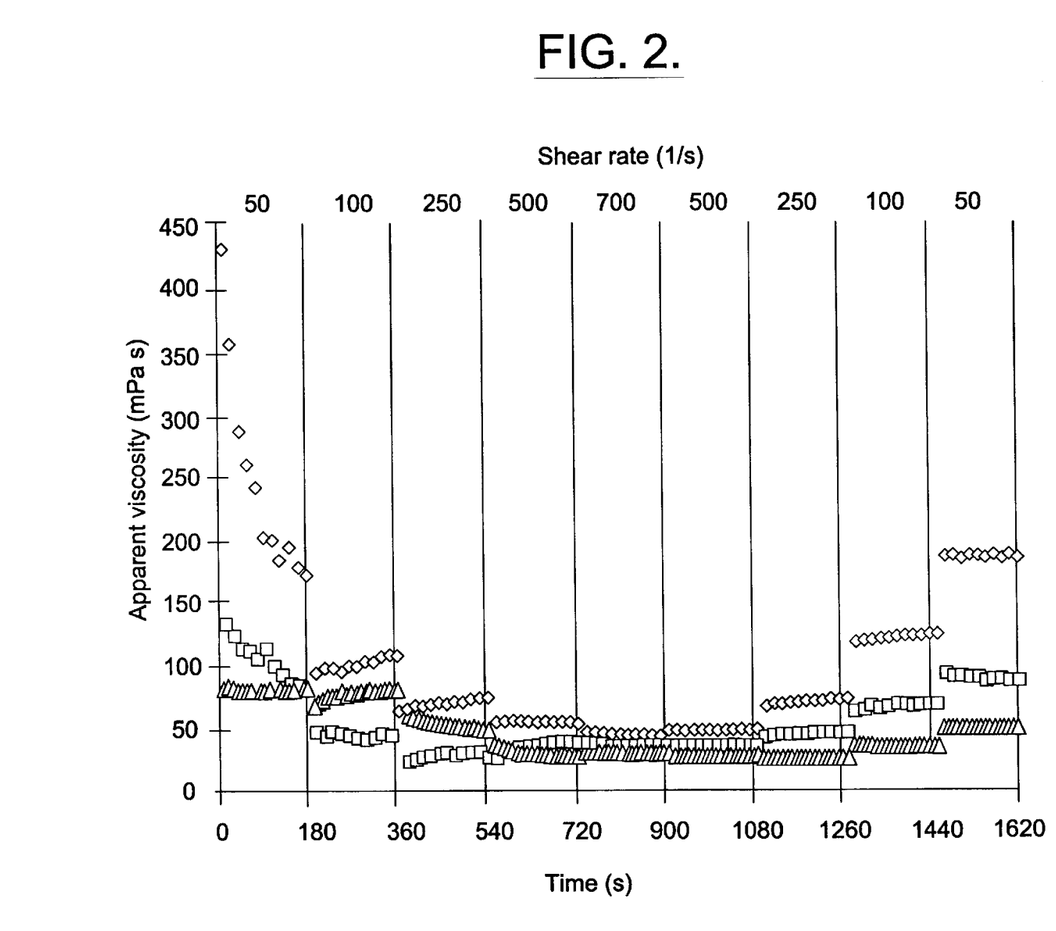
FIG. 2 graphs the apparent viscosity of WPI preparations obtained by two-step heating, as a function of shear time at different shear rates. WPI 4% preparations were heated in a first step at pH 8.0 and then adjusted to 2% concentration and pH of either 6.0, 6.5 or 7.0, prior to the second heating. Dispersions were thixotropic and pseudoplastic. Lowered pH during processing resulted in higher viscosity. Diamonds=4%-to-2% WPI, heated at pH 8.0 and 6.0, squares=4%-to-2% WPI, heated at pH 8.0 and 6.5; and triangles=4%-to-2% WPI, heated at pH 8.0 and 7.0. Values provided are the average of three replications.

FIG. 2 shows viscosity of 4%-to-2% WPI preparations where pH was adjusted prior to the second heating, to 6.0, 6.5 or 7.0. The resulting dispersions were thixotropic and pseudoplastic. Lowered pH during processing resulted in higher viscosity, and a greater degree of non-Newtonian flow. While all dispersions remained homogeneous (no phase separation) and fluid, the high degree of shear thinning in the pH 6.0 solution suggests extensive disruption of a protein aggregate network; however, even after the disruption, the pH 6.0 dispersion had the greatest apparent viscosity.

TABLE 1

FINAL APPARENT VISCOSITY[1]
Shear Rate 50 (l/s)

Whey Protein Polymer/Aggregate Dispersions

| 1st Heating | | 2nd Heating | | Apparent Viscosity | Coefficient |
|---|---|---|---|---|---|
| % protein[2] | pH | % protein[2] | pH | η(mPa s)[3] | of Variation |
| 2 | 8.0 | 2 | 7.0 | 6.15 ± 0.84 | 13.7 |
| 4 | 8.0 | 2 | 6.0 | 175 ± 14 | 8.6 |
| 4 | 8.0 | 2 | 6.5 | 76.9 ± 8.2 | 10.7 |
| 4 | 8.0 | 2 | 7.0 | 41.5 ± 2.2 | 5.3 |
| 4 | 8.0 | 2.5 | 6.0 | 195 ± 24 | 12.3 |
| 4 | 8.0 | 3 | 6.0 | 211 ± 27 | 12.8 |
| 4 | 8.0 | 3.5 | 6.0 | 215 ± 16 | 7.4 |
| 4 | 8.0 | 4 | 6.0 | 680 ± 57 | 8.3 |
| 4 | 8.0 | 2.5 | 7.0 | 36.9 ± 2.9 | 7.9 |
| 4 | 8.0 | 3 | 7.0 | 186 ± 16 | 8.6 |
| 4 | 8.0 | 3.5 | 7.0 | 388 ± 36 | 9.2 |
| 4 | 8.0 | 4 | 7.0 | 511 ± 13 | 2.5 |
| 4 | 8.0 | 2.5 | 8.0 | 1.54 ± 0.27 | 18.0 |
| 4 | 8.0 | 3 | 8.0 | 13.8 ± 1.1 | 8.0 |
| 4 | 8.0 | 3.5 | 8.0 | 30.8 ± 4.9 | 15.9 |
| 4 | 8.0 | 4 | 8.0 | 103 ± 10 | 9.7 |

| Carbohydrate hydrocolloids | | |
|---|---|---|
| 1% xanthan gum | 135 ± 10 | 7.4 |
| 1% gellan gum | 627 ± 39 | 6.2 |
| 1% guar gum | 185 ± 14 | 7.6 |
| 1% locust bean gum | 690 ± 28 | 4.1 |

[1]Viscosity of solutions after the shear sweep described herein.
[2]Protein concentration (% w/v).
[3]mPa s = milliPascal seconds; mean value of three replications ± standard deviation.

EXAMPLE 3

Final Viscosity of WPI Preparations of Varied Concentration

Heated to pH 6.0 During Second Stage

Figure 3:
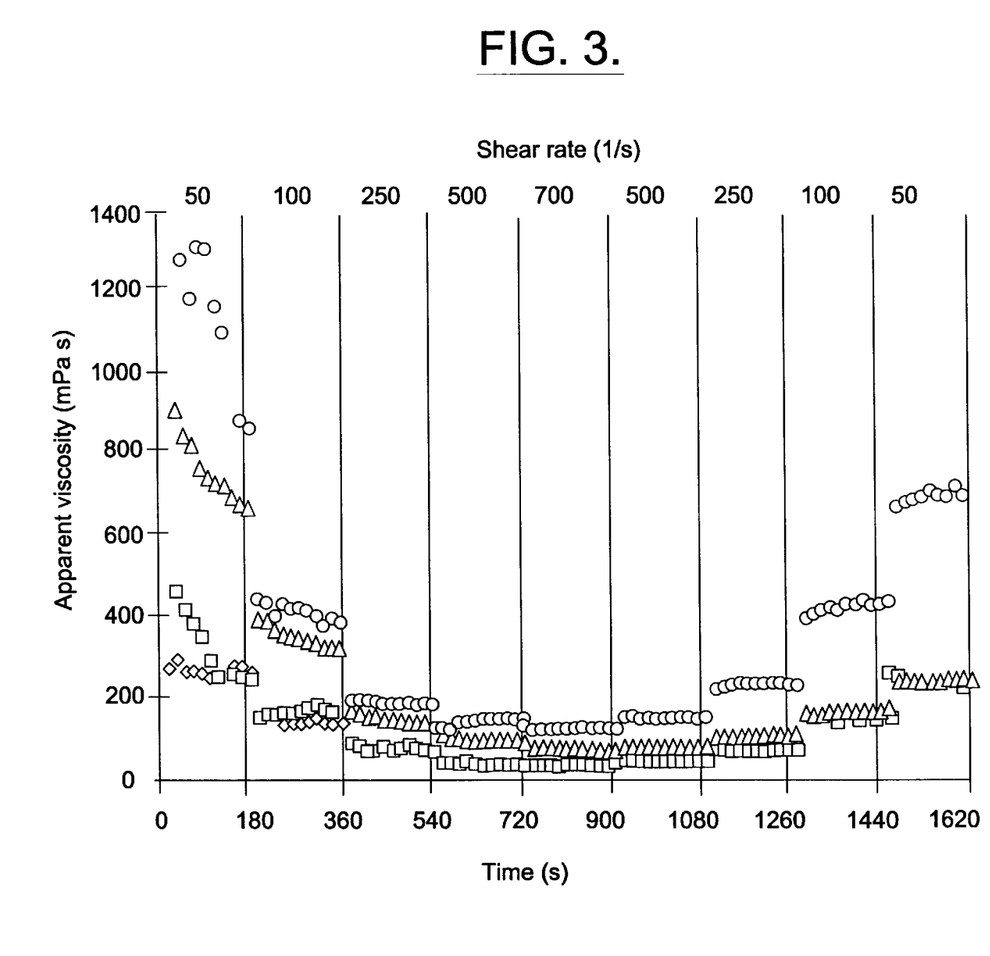
FIG. 3 graphs the apparent viscosity as a function of shear time for WPI solutions heated at a first pH and first concentration, then diluted and heated at a second concentration and pH. Diamonds represent a 4%-to-2.5% WPI heated first at pH 8.0 and then at pH 6.0; squares represent a 4%-to-3% WPI heated first at pH 8.0 and then at pH 6.0; triangles represent a 4%-to-3.5% WPI heated first at pH 8.0 and then at pH 6.0; and circles represent a 4%-to-4% (undiluted) WPI heated first at pH 8.0 and then at pH 6.0. The second heating at pH 6.0 did not produce a concentration dependent increase in viscosity at concentrations≦3.5%. All dispersions were pseudoplastic and thixotropic; shear forces readily broke the particles, resulting in a decrease in viscosity with shear time. Values provided are the average of three replications.
Figure 4:
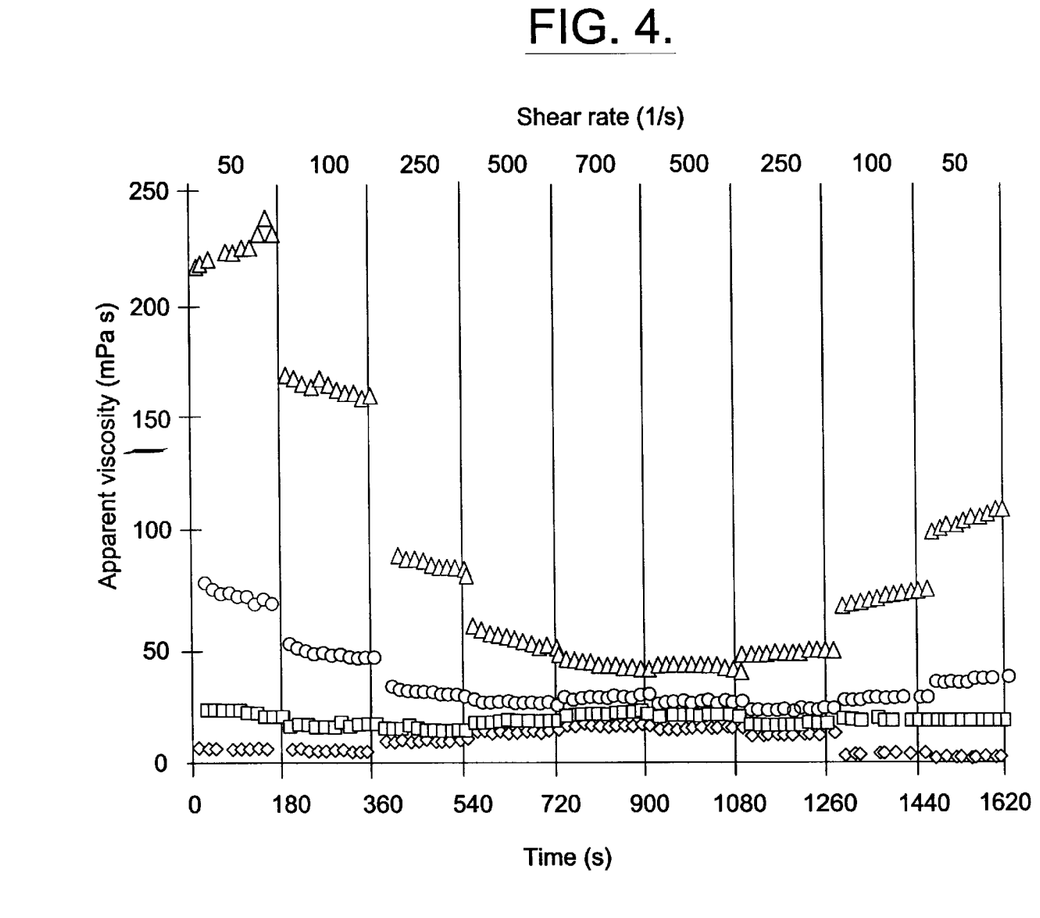
FIG. 4 graphs apparent viscosity as a function of shear time at different shear rates for WPI dispersions obtained by heating a WPI solution at pH 8.0, then diluting and heating the solution at a second concentration (but still at pH 8.0). Triangles represent a 4%-to-2.5% WPI; squares represent a 4%-to-3% WPI; circles represent a 4%-to-3.5% WPI; and triangles represent a 4%-to-4% (no dilution) WPI. The dispersions obtained were generally thixotropic but a dilatant behavior was observed at 2.5% protein concentration. At higher concentrations aggregates formed which were disrupted with time and at higher shear rates. Dispersions at protein concentrations>2.5% were pseudoplastic and thixotropic. Values provided are the average of three replications.
Figure 5:
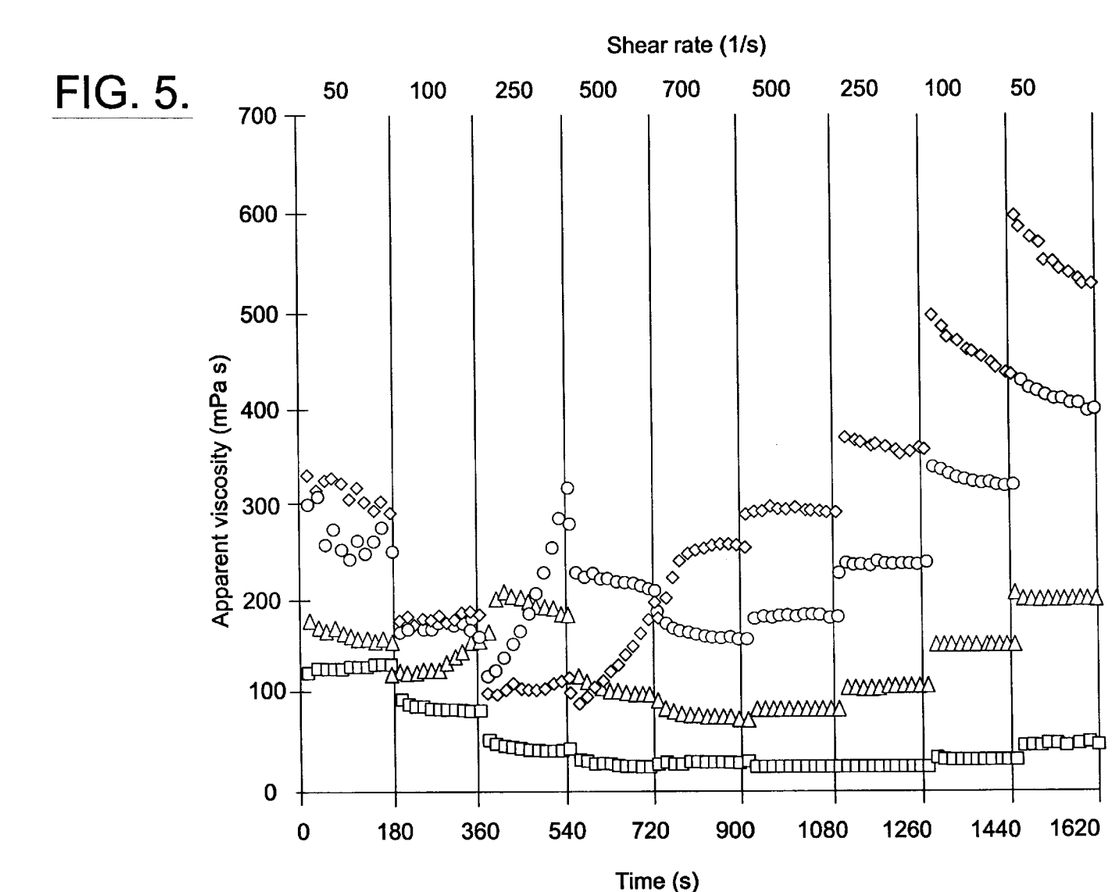

FIGS. 3–5 show the influence of protein concentration and pH during the second heating on viscosity. All pH 6.0 dispersions were pseudoplastic and thixotropic (FIG. 3). Shear forces readily broke the particles, resulting in a decrease in viscosity with shear time. Higher shear rates resulted in lower viscosity.

EXAMPLE 4

Viscosity of WPI Dispersions Prepared with Second Heating at pH 8.0

Dispersions obtained with a second heating at pH 8.0 ranged in viscosity from 1.5–103 mPa s (Table 1), and were generally thixotropic but a dilatant behavior was observed at 2.5% final protein concentration (FIG. 4). This is usually an indication that the applied force is causing the material to adopt a more ordered structure or that there are greater interactions between particles. Linearly polymerized particles connected by strong covalent bonds do not break at high shear rates, but adopt more ordered structure. Another explanation is that formation of intermolecular disulfide bonds at pH 8 prevents the reversibility of modifications in the tertiary structure of whey proteins caused by shear. Dilatant behavior was observed only at low final protein concentration (2.5%). At higher final concentrations, polymer/aggregates formed which were disrupted with time and at higher shear rates. Dispersions at protein concentrations>2.5% were pseudoplastic and thixotropic (FIG. 4).

EXAMPLE 5

Viscosity of WPI Dispersions Prepared with Second Heating at pH 7.0

An interesting behavior was observed in dispersions when the pH was changed from 8 to 7 before the second heating (FIG. 5). Only those dispersions at 2.5% final protein showed thixotropic properties. Dispersions formed at protein concentrations≧3.0% were rheopectic. This increase in viscosity with time at a constant shear rate was shear rate specific for each protein concentration. The shear rate showing rheopectic behavior increased as protein concentration increased: for 3, 3.5 and 4% protein, viscosity increase occurred at 100, 250 and 500 (l/s), respectively. A possible explanation for this behavior is an order-disorder transition (see Barnes, J. Rheol. 39:329–366, 1989). At lower shear rates, layers of polymers flow one over another. At the critical shear rate value, repulsive forces between whey protein particles responsible for separating flowing layers could be overcome by hydrodynamic forces and the structure would become more disordered. This would lead to the formation of clusters, resulting in higher viscosity. According to Boersma et al. (J. Rheol. 39:841–860 1995), order-disorder transitions leading to cluster generation is responsible for rheopectic properties in dispersions. At higher protein concentrations, larger clusters would be formed and the hydrodynamic forces required to disrupt the more dense structures would be greater, so the rheopectic behavior was observed at higher shear rate values (FIG. 5).

EXAMPLE 6

Rheopectic Properties of 4% WPI Dispersions

Figure 6:
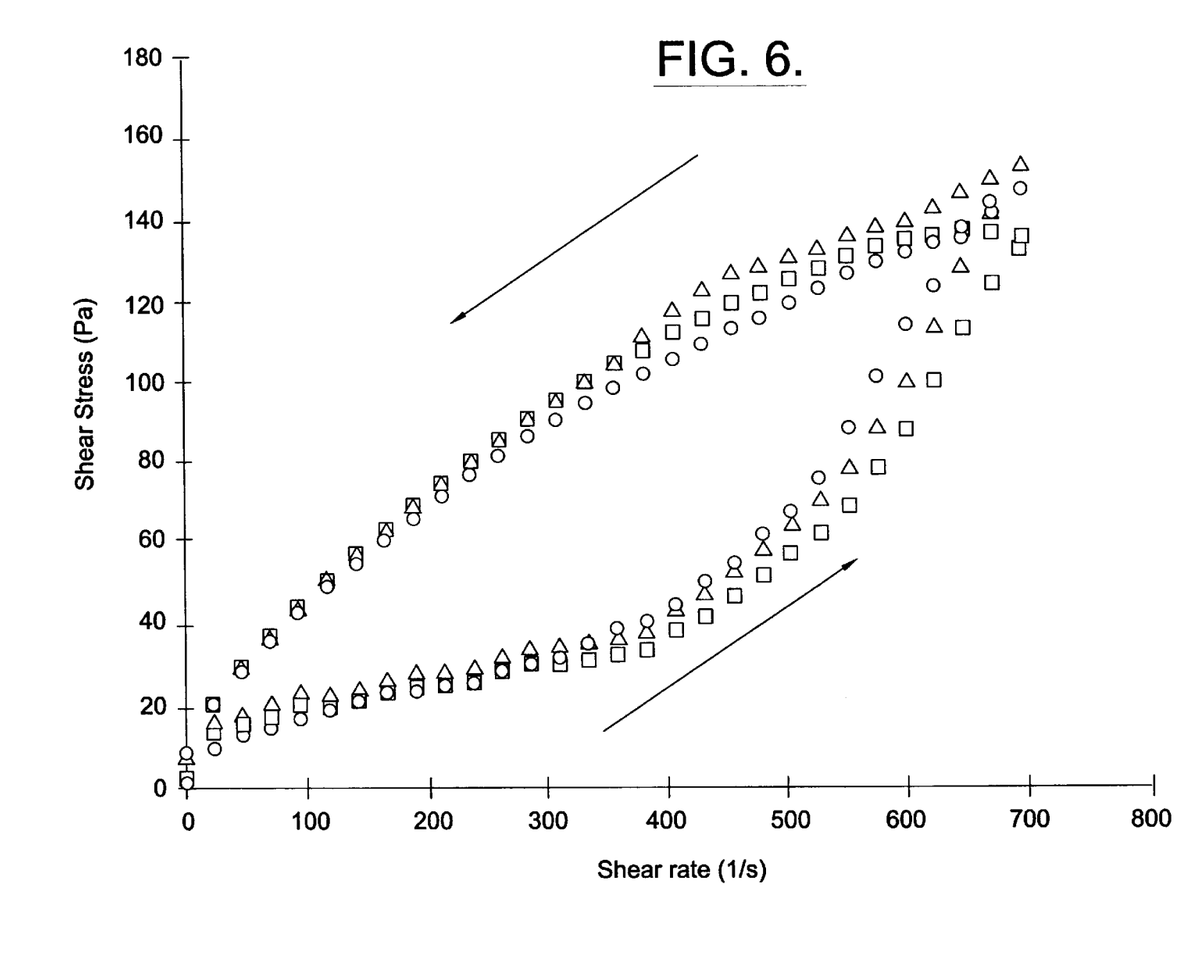
FIG. 6 graphs rheopectic properties (shear stress vs. shear rate behavior) of 4% WPI dispersions obtained by first heating at pH 8.0 and a second heating at pH 7.0. The most dynamic increase in viscosity was observed in the shear rate range of 400–700 1/s. This is consistent with rheopectic behavior of 4% dispersions at a shear rate 500 1/s as shown in FIG. 5. Three replications were conducted; individual trials are indicated by squares, triangles and circles.
Figure 7:
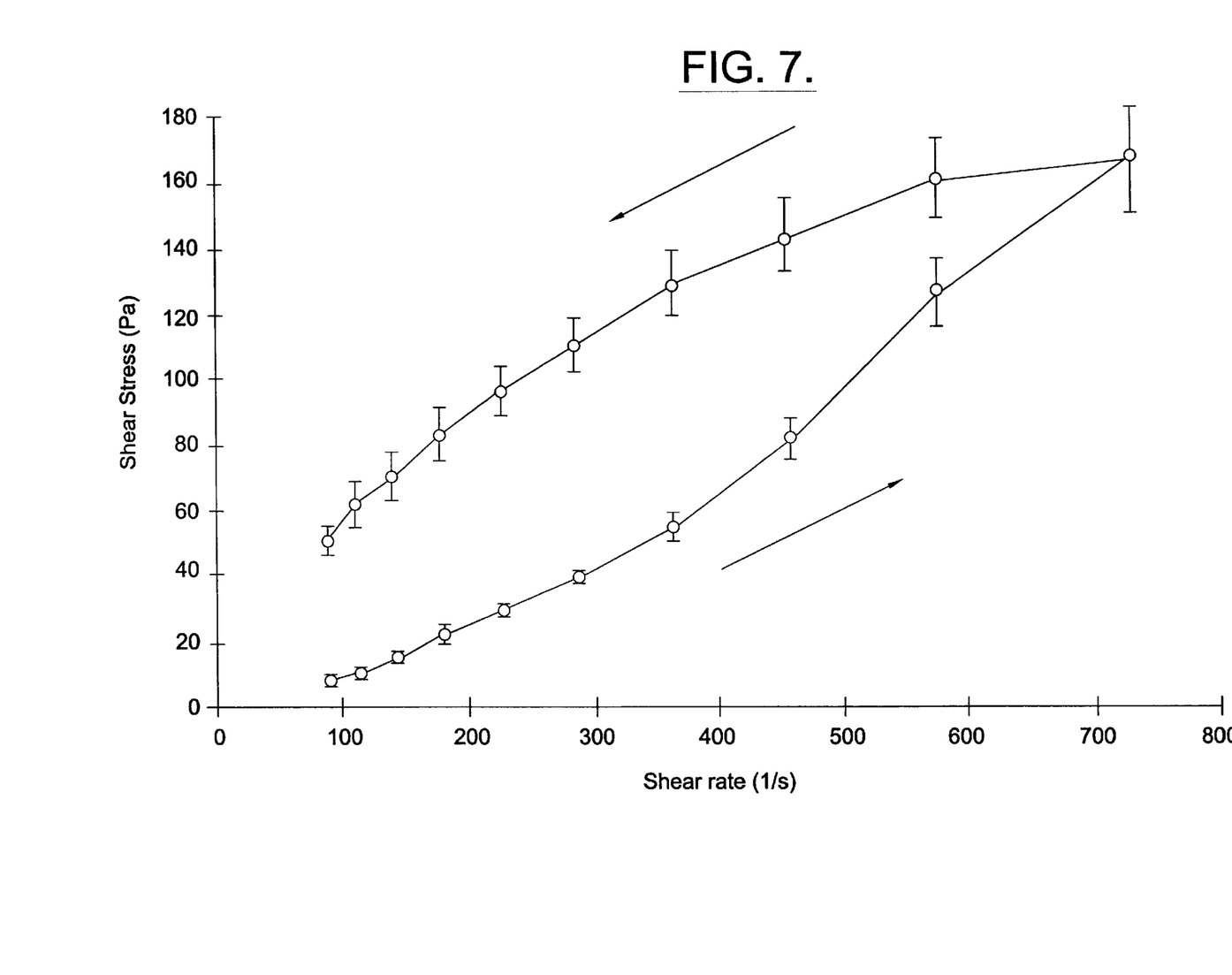
FIG. 7 graphs rheopectic properties (shear stress vs. shear rate behavior) of 4% WPI dispersions obtained by first heating at pH 8.0 and a second heating at pH 7.0. These measurements were made using a different rheometer than that used for FIG. 6. Values provided are the average of three replications.

Rheopectic properties of 4% (final concentration) whey protein dispersions were shown in shear rate sweep experiments by hysteresis loops (FIGS. 6 and 7). Despite different gap sizes in the two rheometers used (see Example 1, Materials and Methods), flow properties observed with the two rheometers were similar. Systems with different gap sizes were chosen because, according to Chow and Zukoski (J. Rheol. 39:15–32, 1995), thickening is associated with formation of structures of a size comparable to the rheometer tool gap. The most dynamic increase in viscosity was observed in the shear rate range of 400–700 l/s (FIGS. 6 and 7). This is consistent with rheopectic behavior of 4% dispersions at a shear rate 500 l/s (FIG. 5).

EXAMPLE 7

Viscosity of 4% WPI Dispersions at pH 7.0

Figure 8:
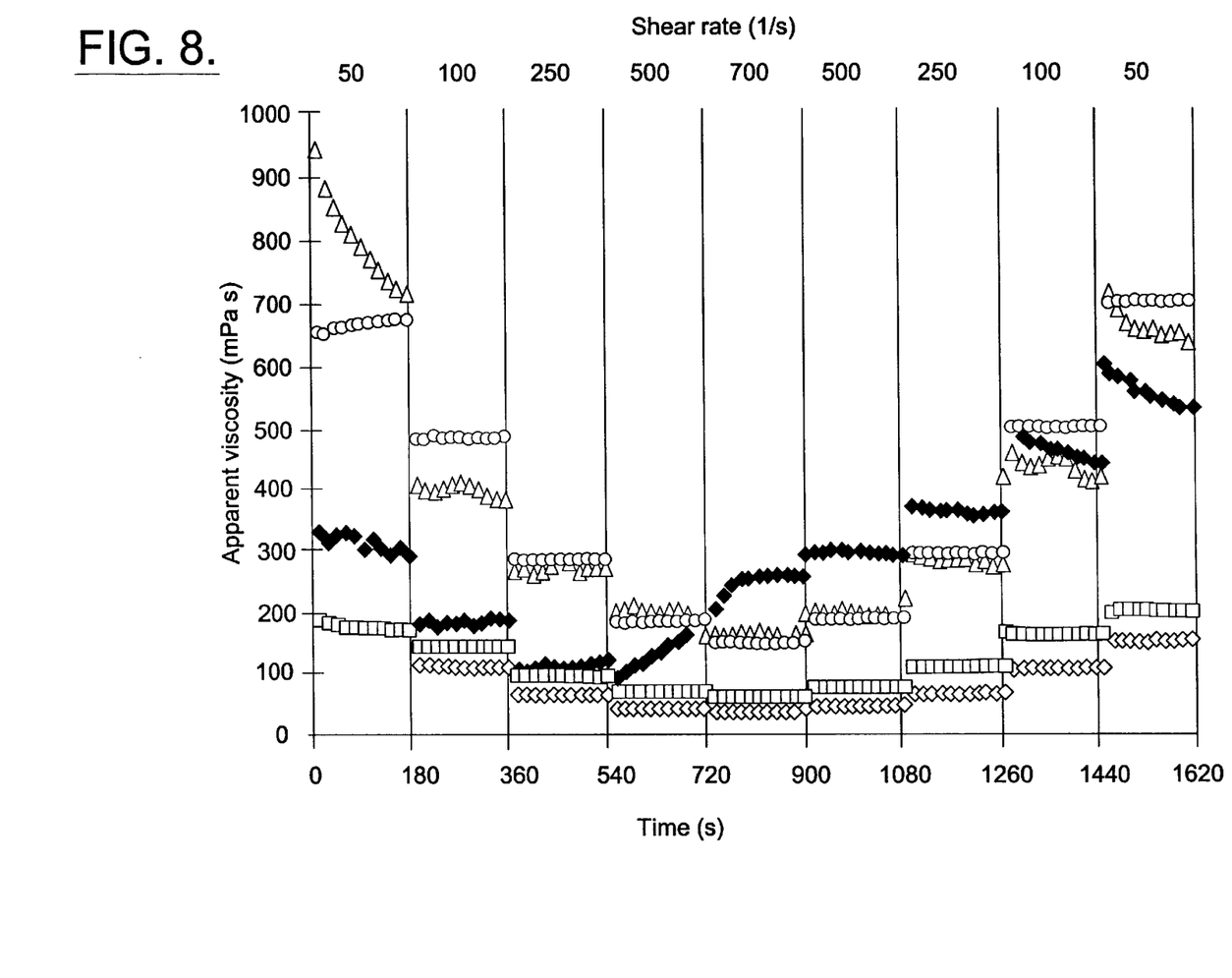
FIG. 8 graphs apparent viscosity as a function of shear time at different shear rates for a 4% WPI dispersion produced by two step heating at pH 8.0 and pH 7.0 (solid diamonds); 1% xanthan gum (open diamonds); 1% gellan (open triangles); 1% guar gum (open squares); and 1% locust bean gum (open circles). Viscosity of the 4% WPI dispersion at pH 7.0 (50 1/s) was about 500 mPa s. All polysaccharides were pseudoplastic; gellan and xanthan gum were also thixotropic. The final viscosity of the 4% (w/v) WPI dispersion was about three times higher than that of xanthan gum and guar gum, and about 100 (mPa s) lower than locust bean and gellan gum. Values shown are the average of three replications.

Viscosity of a 4% (final concentration) whey protein dispersion at pH 7.0 (second heating at pH 7.0) was about 500 mPa s (50 l/s). This dispersion was translucent, viscous, and had a very smooth texture and was therefore chosen for comparison with rheological properties of polysaccharides (FIG. 8). All polysaccharides were pseudoplastic, and gellan and xanthan gum were also thixotropic. The final viscosity of 4% (w/v) whey protein polymer/aggregate dispersions was about three times higher than that of xanthan gum and guar gum, and about 100 (mPa s) lower than locust bean and gellan gum. The main difference between the whey protein dispersions and the polysaccharide dispersions was the strong rheopectic properties of the former. Such shear-induced increase in viscosity is a rare phenomenon in food products, and has only previously been reported for starch dispersions (Bagley and Christianson, *J. Texture Studies* 13:115–126 (1982); Dintzis et al. *J. Rheol.* 39:1399–1409 (1995); Silva et al. *J. Texture Studies* 28:123–138 (1997)).

EXAMPLE 8

Optical Density

The optical density of whey protein products produced using different methods was measured at a wavelength of 630 nm (1 cm pathlength). Results are provided in Table 2, below.

TABLE 2

| Product | Optical Density at 630 nm |
|---|---|
| Whey protein 2-step heating: | 1.09 |
| 4% protein at pH 8.0; | |
| 4% protein at pH 7.0 | |
| Whey Protein 1-step heating: | >2.50 |
| 4% protein at pH 7.0 | |
| 1% xanthan gum | 0.58 |
| 1% locust bean gum | 0.53 |

EXAMPLE 9

Mathematical Modeling

The interdependence of viscosity, shear rate and shearing time can be represented by mathematical models. Modeling enables transformation of many results into a few coefficients calculated by the least squares method (Korolczuk and Mahaut, *Lait* 70:15–21 (1990); Korolczuk, *J. Dairy Sci.* 60:593–601 (1993)). The following mathematical model was applied:

$$\log \eta_{t,\gamma} = \log \eta_{1,1} + A \log \gamma + B \log t$$

where: $\eta$-apparent viscosity; t-time; $\gamma$-shear rate.

Coefficients of regression equations are shown in Table 3. In some cases where relationships were more complicated, regression calculations were restricted to various time ranges. Obtained equations are in good agreement with experimental data ($R^2$=0.998–0.812).

The value for log $\eta_{1,1}$ shows which dispersions are generally more viscous. The highest values were obtained for dispersions which had a second heating at pH 6.0 and the smallest for dispersions with the pH adjusted before second heating to 8.0.

Coefficient A shows the influence of shear rate on viscosity. Negative values indicate pseudoplastic properties, and positive values indicate dilatant properties. All dispersions, apart from those at 2.5 and 3.0% protein at pH 8.0, were pseudoplastic.

Coefficient B shows the influence of time on viscosity. Negative values indicate thixotropic properties. This was the most common response (Table 3). The opposite phenomenon—rheopectic flow—was observed for 3% and 4.0% dispersions at pH 8 (second heating), for pH 6.5 (second heating) at some shear rate ranges, and minimally for locust bean gum. High values of coefficient B were noted at some shear rate ranges for dispersions obtained by second heating at pH 7.0.

The foregoing examples are illustrative of the present invention, and are not to be construed as limiting thereof. The invention is described by the following claims, with equivalents of the claims to be included therein.

TABLE 3

Coefficients of Regression Equations (P < 0.05)
of Mathematical Model log $\eta_{t,y}$ = log $\eta_{1,1}$ + Alog$\gamma$ + Blog t

| Whey protein dispersion | log $\eta_{t,y}$ | A | B | $R^2$ |
|---|---|---|---|---|
| 4–2%, pH 8.0–6.0 | 3.57 | −0.22 | −0.46 | 0.964 |
| 4–2%, pH 8.0–6.5 (I)[a] | 3.76 | −0.79 | −0.22 | 0.986 |
| 4–2%, pH 8.0–6.5 (II) | ns | ns | 0.73 | 0.839 |
| 4–2%, pH 8.0–6.5 (III) | ns | ns | −0.54 | 0.922 |
| 4–2%, pH 8.0–7.0 | 2.65 | −0.55 | 0.12 | 0.910 |
| 4–2.5%, pH 8.0–6.0 | 3.64 | −0.61 | −0.12 | 0.938 |
| 4–3%, pH 8.0–6.0 | 3.84 | −084 | ns | 0.986 |
| 4–3.5%, pH 8.0–6.0 | 4.57 | −0.70 | −0.26 | 0.995 |
| 4–4%, pH 8.0–6.0 | 4.71 | −0.49 | −0.45 | 0.973 |
| 4–2.5%, pH 8.0–7.0 | 3.26 | −0.68 | ns | 0.968 |
| 4–3%, pH 8.0–7.0 (I)[b] | 2.87 | −0.64 | 0.21 | 0.812 |
| 4–3%, pH 8.0–7.0 (II) | 5.19 | −0.65 | −0.51 | 0.982 |
| 4–3.5%, pH 8.0–7.0 (I)[c] | 3.51 | −0.55 | −0.08 | 0.977 |
| 4–3.5%, pH 8.0–7.0 (II) | ns | ns | 2.77 | 0.985 |
| 4–3.5%, pH 8.0–7.0 (III) | 5.08 | −0.60 | −0.41 | 0.995 |
| 4–4%, pH 8.0–7.0 (I)[d] | 3.60 | −0.59 | ns | 0.972 |
| 4–4%, pH 8.0–7.0 (II) | −4.80 | ns | 2.22 | 0.964 |
| 4–2.5%, pH 8.0–8.0 | 0.28 | 0.68 | −0.37 | 0.893 |
| 4–3%, pH 8.0–8.0 (I)[e] | 1.85 | −0.17 | −0.12 | 0.936 |
| 4–3%, pH 8.0–8.0 (II) | ns | 0.29 | 0.20 | 0.974 |
| 4–3.5%, pH 8.0–8.0 | 2.64 | −0.29 | −0.17 | 0.923 |
| 4–4%, pH 8.0–8.0 | 3.48 | −0.73 | 0.07 | 0.983 |
| 1% xanthan gum | 3.38 | −0.58 | −0.08 | 0.998 |
| 1% gellan gum | 3.98 | −0.41 | −0.22 | 0.982 |
| 1% guar gum | 2.97 | −0.45 | ns | 0.973 |
| 1% locust bean gum | 3.80 | −0.64 | 0.06 | 0.989 | ns = coefficient statistically non-significant (P > 0.05)
[a]- regression calculated in time range (I) 0–360 seconds; (II) 360–720 s; (III) 720–900s.
[b]- regression calculated in time range (I) 0–360 s; (II) 360–900 s.
[c]- regression calculated in time range (I) 0–360 s; (II) 360–540 s; (III) 540–900 s.
[d]- regression calculated in time range (I) 0–540 s; (II) 540–900 s.
[e]- regression calculated in time range (I) 0–495 s; (II) 495–900 s.

That which is claimed is:

1. A method of producing a whey protein product, comprising:
   a) providing a solution of whey proteins of at least about 2% whey proteins and having a pH of at least about 8.0;
   b) heating said solution of whey proteins in a first heating step;
   c) cooling said solution of whey proteins;
   d) adjusting the pH of said solution of whey proteins to less than about pH 8.0; and
   e) heating said whey protein solution in a second heating to produce a whey protein product.

2. A method according to claim 1, wherein said solution of whey proteins is at least about 4% whey proteins.

3. A method according to claim 1, wherein said solution of whey proteins is from about 2% to about 8% whey proteins.

4. A method according to claim 1, wherein said solution of whey proteins is from about 4% to about 6% whey proteins.

5. A method according to claim 1 wherein said solution of whey proteins is cooled to at least about 60° C.

6. A method according to claim 1 wherein said solution of whey proteins is cooled to a temperature below a gelation point of the whey proteins.

7. A method according to claim 1 wherein the pH of said solution of whey proteins prior to said first heating step is from about pH 8.0 to about pH 8.5.

8. A method according to claim 1 wherein said first heating step is at a temperature of greater than about 60° C.

9. A method according to claim 1 wherein said first heating step is at a temperature in the range of from about 75° C. to about 95° C.

10. A method according to claim 1 wherein said first heating step lasts from about 10 minutes to about 120 minutes.

11. A method according to claim 1 wherein said whey protein solution has a pH of from about 6.0 to about 7.5 prior to said second heating step.

12. A method according to claim 1 wherein said whey protein solution has a pH of about 7.0 prior to said second heating step.

13. A method according to claim 1 wherein said second heating step is at a temperature in the range of from about 75° C. to about 95° C.

14. A method according to claim 1 wherein said second heating step lasts from about 30 minutes to about 90 minutes.

15. A method according to claim 1, further comprising the step of drying said whey protein product.

16. A method of producing a whey protein product, comprising:
   a) providing a first solution of whey proteins having a pH of at least about 8.0;
   b) heating said first solution of whey proteins in a first heating;
   c) cooling said first solution of whey proteins;
   d) diluting said whey protein solution to provide a diluted whey protein solution;
   e) adjusting the pH of said diluted whey protein solution to less than about 8.0; and
   f) heating said diluted whey protein solution in a second heating step to produce a whey protein product.

17. A method according to claim 16 wherein said solution of whey proteins is cooled to at least about 60° C.

18. A method according to claim 16 wherein said solution of whey proteins is cooled to a temperature below a gelation point of the whey proteins.

19. A method according to claim 16 wherein said first whey protein solution has a concentration of at least about 4% whey protein.

20. A method according to claim 16, wherein said first solution of whey proteins is from about 4% to about 8% whey proteins.

21. A method according to claim 16, wherein said first solution of whey proteins is from about 4% to about 6% whey proteins.

22. A method according to claim 16 wherein said first whey protein solution has a pH of from about 8.0 to about 8.5.

23. A method according to claim 16 wherein said first whey protein solution has a pH of about 8.0.

24. A method according to claim 16 wherein said first heating step is at a temperature in the range of from about 75° C. to about 95° C.

25. A method according to claim 16 wherein said first heating step lasts from about 10 minutes to about 120 minutes.

26. A method according to claim 16 wherein said diluted whey protein has a concentration below a gelation point of the whey proteins.

27. A method according to claim 16 wherein said diluted whey protein solution has a concentration of from about 1.5% to about 3.5% whey protein.

28. A method according to claim 16 wherein said diluted whey protein solution has a concentration of from about 1.5% to about 2.5% whey protein.

29. A method according to claim 16 wherein the pH of said diluted whey protein solution is adjusted to a pH of from about 5.0 to about 7.5.

30. A method according to claim 16 wherein the pH of said diluted whey protein solution is adjusted to a pH of from about 6.0 to about 7.0.

31. A method according to claim 16 wherein said second heating step is at a temperature of greater than about 60° C.

32. A method according to claim 16 wherein said second heating step is at a temperature in the range of from about 75° C. to about 95° C.

33. A method according to claim 16 wherein said second heating step lasts from about 30 minutes to about 90 minutes.

34. A method according to claim 16, further comprising the step of drying said whey protein product.

35. A method of producing a whey protein product, comprising:
   a) providing a first solution of whey proteins having a concentration of about 4% whey proteins and a pH of about 8.0;
   b) heating said first solution of whey proteins in a first heating at a temperature of at least about 75° C.;
   c) cooling said whey protein solution to a temperature below the gellation point of the whey proteins;
   d) diluting said whey protein solution to provide a diluted whey protein solution having a concentration of from about 2.5% to about 3.5% whey proteins;
   e) adjusting the pH of said diluted whey protein solution to about 7.0; and
   f) heating said diluted whey protein solution in a second heating step at least about 75° C. to produce a whey protein product.

36. A method of producing a whey protein product, comprising:
   a) providing a whey protein solution having a concentration of about 4% whey proteins and a pH of about 8.0;
   b) heating said whey protein solution in a first heating step at a temperature of at least about 75° C.;
   c) cooling said solution of whey proteins to a temperature below the gellation point of said whey proteins;
   d) adjusting the pH of said solution of whey proteins to about 7.0, and
   e) heating said whey protein solution in a second heating step at a temperature of at least about 75° C. to produce a whey protein product.

37. A method of producing a whey protein product, comprising:
   a) providing a solution of whey proteins of at least about 2% whey proteins and having a pH of at least about 8.0;
   b) heating said solution of whey proteins in a first heating step;
   c) cooling said solution of whey proteins;
   d) adjusting the pH of said solution of whey proteins to less than about pH 8.0; and e) heating said whey protein solution in a second heating step at a temperature of greater than about 60° C. to produce a whey protein product.

38. A method of producing a whey protein product, comprising:
   a) providing a first solution of whey proteins having a pH of at least about 8.0;
   b) heating said solution of whey proteins in a first heating step;
   c) cooling said first solution of whey proteins;
   d) diluting said whey protein solution to provide a diluted whey protein solution;
   e) adjusting the pH of said diluted whey protein solution to less than about 8.0; and
   f) heating said diluted whey protein solution in a second heating step at a temperature of greater than about 60° C. to produce a whey protein product.

39. A method of producing a whey protein product, comprising:
   a) providing a solution of whey proteins of at least about 2% whey proteins and having a pH of at least about 8.0;
   b) heating said solution of whey proteins in a first heating step;
   c) cooling said solution of whey proteins;
   d) adjusting the pH of said solution of whey proteins to less than about pH 8.0; and
   e) heating said whey protein solution in a second heating step to produce a whey protein dispersion.

40. A method of producing a whey protein product, comprising:
   a) providing a first solution of whey proteins having a pH of at least about 8.0;
   b) heating said solution of whey proteins in a first heating step;
   c) cooling said first solution of whey proteins;
   d) diluting said whey protein solution to provide a diluted whey protein solution;
   e) adjusting the pH of said diluted whey protein solution to less than about 8.0; and
   f) heating said diluted whey protein solution in a second heating step to produce a whey protein dispersion.

41. The method of claim 39, further comprising the step of drying the whey protein dispersion to form a powder.

* * * * *